US008072175B2

(12) United States Patent
Fukunishi

(10) Patent No.: US 8,072,175 B2
(45) Date of Patent: Dec. 6, 2011

(54) SEMICONDUCTOR DEVICE FOR CONTROLLING ROTATION OF MOTOR

(75) Inventor: Tatsuya Fukunishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 282 days.

(21) Appl. No.: 11/826,953

(22) Filed: Jul. 19, 2007

(65) Prior Publication Data
US 2008/0024086 A1     Jan. 31, 2008

(30) Foreign Application Priority Data

Jul. 25, 2006  (JP) .................................. 2006-202442

(51) Int. Cl.
*H02P 6/08*         (2006.01)
(52) U.S. Cl. .......................... 318/619; 318/609; 318/610
(58) Field of Classification Search .................. 318/619, 318/610, 609
See application file for complete search history.

(56) References Cited

U.S. PATENT DOCUMENTS

| 5,191,272 | A | * | 3/1993 | Torii et al. ...................... 318/609 |
| 5,223,778 | A | * | 6/1993 | Svarovsky et al. ............. 318/610 |
| 5,374,882 | A | * | 12/1994 | Matsubara et al. ............ 318/560 |
| 5,410,234 | A | * | 4/1995 | Shibata et al. ................. 318/700 |
| 5,473,534 | A | * | 12/1995 | Miyahara ......................... 700/37 |
| 5,475,291 | A | * | 12/1995 | Yoshida et al. ........... 318/568.22 |
| 5,684,374 | A | * | 11/1997 | Chaffee ......................... 318/616 |
| 6,198,246 | B1 | * | 3/2001 | Yutkowitz ..................... 318/561 |
| 6,236,182 | B1 | * | 5/2001 | Kerner ........................... 318/609 |
| 6,252,369 | B1 | * | 6/2001 | Kaku et al. .................... 318/609 |
| 6,920,341 | B2 | | 7/2005 | Fukunishi |
| 7,035,695 | B2 | * | 4/2006 | Boiko ............................. 700/28 |
| 7,057,366 | B1 | * | 6/2006 | Tsai et al. ..................... 318/561 |

FOREIGN PATENT DOCUMENTS

| JP | 05-168270 | 7/1993 |
| JP | 07-194157 | 7/1995 |
| JP | 2005-110368 | 4/2005 |
| JP | 2005-168138 | 6/2005 |
| JP | 2005-198468 | 7/2005 |
| JP | 2005-237094 | 9/2005 |
| JP | 2005-333689 | 12/2005 |
| JP | 2005-204404 | 7/2006 |

\* cited by examiner

*Primary Examiner* — Walter Benson
*Assistant Examiner* — David Luo
(74) *Attorney, Agent, or Firm* — Dickstein Shapiro LLP

(57) ABSTRACT

A semiconductor device included in a motor driving apparatus for driving a motor is disclosed. The semiconductor device configured to control rotation of the motor by changing the gain of a control loop of the motor driving apparatus. The semiconductor apparatus includes plural gain maintaining parts, each gain maintaining part maintaining at least one gain, and a gain switching part for switching the gains maintained in the gain maintaining parts according to a rotational frequency of the motor.

4 Claims, 8 Drawing Sheets

US 8,072,175 B2

SEMICONDUCTOR DEVICE FOR CONTROLLING ROTATION OF MOTOR

BACKGROUND OF THE INVENTION

1. Field of the Invention

The present invention relates to a semiconductor device for controlling rotation of a motor.

2. Description of the Related Art

A device using a motor (e.g., DC motor) includes a motor driving apparatus as shown in FIG. 1. FIG. 1 is a schematic diagram showing a motor driving apparatus 10. The motor driving apparatus 10 includes a motor 11, a sensor for detecting the rotational position and the rotational frequency (number of revolutions) of the motor 11, a semiconductor device 13 serving as a motor control IC for controlling rotational frequency and protection operation of the motor 11, and a driver 14 for supplying driving current for driving the motor 11. The motor driving apparatus 10 operates as a closed loop by repeating the processes of analyzing the rotational frequency and phase data of the motor 11 detected by the sensor 12 by using the semiconductor device 13 and correcting the rotational frequency and the phase of the motor 11 so that the rotational frequency and the phase are controlled to desired values.

By setting the overall gain of the closed loop of the motor driving apparatus 10 to an appropriate value, the motor 11 can be steadily rotated. As shown in FIG. 2, the overall gain of the closed loop of the motor driving apparatus 10 is determined according to the gain of its speed system (speed system gain), the gain of its phase system (phase system gain), the gain of its loop (loop gain), the gain of its drive system (drive system gain), and the characteristics of the motor 11. FIG. 2 is a schematic diagram for describing the overall gain of the motor driving apparatus 10.

As shown in FIG. 3, the speed system gain, the phase system gain, and the loop gain are each determined (fixed) according to the constant of a component that is externally mounted on the motor control IC (semiconductor device) 13. FIG. 3 is a schematic diagram for describing an external (outside) component of the motor driving apparatus 10. The driving gain is determined by controlling the electric current value of the drive current supplied to the driver 14. Therefore, in order to control the rotation of the motor 11 for the above-described motor driving apparatus 10, the overall gain of the closed loop is changed by adjusting only the drive gain by changing the drive current supplied to the driver 14.

For example, in a case of activating a motor of a motor driving apparatus such as the above-described motor driving apparatus 10, a large drive torque is required for rotating the stopped motor (stopped state of motor). In such a case, the motor driving apparatus 10 is controlled so as to increase follow-up speed and shorten the activation time by increasing drive current and increasing the drive gain.

For example, Japanese Laid-Open Patent Application No. 2005-198468 (hereinafter referred to as "Patent Document 1"), discloses a motor control apparatus and an image forming apparatus that reduces the time for starting a printing operation by shortening the time of waiting for a polygon motor to reach steady state rotation. Furthermore, Japanese Laid-Open Patent Application No. 2005-110368 (hereinafter referred to as "Patent Document 2") discloses a motor driving apparatus, an integrated circuit, and a motor driving method that can switch the gain for outputting control signals.

However, with the above-described motor driving apparatuses, the change of speed of the motor becomes greater as the drive gain increases. This also increases unevenness in the rotation of the motor. Furthermore, the above-described motor driving apparatuses require a large drive current for increasing their drive gains. Therefore, a large drive current is supplied to the circuitry (circuit components) in the motor driving apparatuses. This leads to an increase of heat in the circuitry and deterioration of or damage to the circuitry.

In a case where the maximum value of the drive current is not appropriately set, the jitter (ringing) as shown in FIG. 4 does not settle out even after the rotational frequency of the motor reaches a desired rotational frequency, thereby requiring time for the drive current to stabilize. FIG. 4 is a schematic diagram for describing the start-up (activation) time and the rotational frequency of a motor of a related art case. Accordingly, an apparatus (e.g., image forming apparatus) having a motor driving apparatus of a related art case requires a long start-up time.

Furthermore, the above-described motor driving apparatuses control rotation by only changing the drive gain where the speed system gain, the phase system gain, and the loop gain remain fixed (unchanged). This lowers the versatility of the motor driving apparatus.

SUMMARY OF THE INVENTION

The present invention may provide a semiconductor device that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a semiconductor device particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a semiconductor device included in a motor driving apparatus for driving a motor, the semiconductor device configured to control rotation of the motor by changing the gain of a control loop of the motor driving apparatus, the semiconductor apparatus including a plurality of gain maintaining parts, each gain maintaining part maintaining at least one gain therein; and a gain switching part for switching the gains maintained in the gain maintaining parts according to a rotational frequency of the motor.

Furthermore, another embodiment of the present invention provides a semiconductor device included in a motor driving apparatus for driving a motor, the semiconductor device configured to control rotation of the motor by changing the gain of a control loop of the motor driving apparatus, the semiconductor apparatus including: a plurality of gain maintaining parts, each gain maintaining part maintaining at least one gain therein; and a control part for rewriting the gains maintained in the gain maintaining parts according to a rotational frequency of the motor.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

First Embodiment

Figure 5:
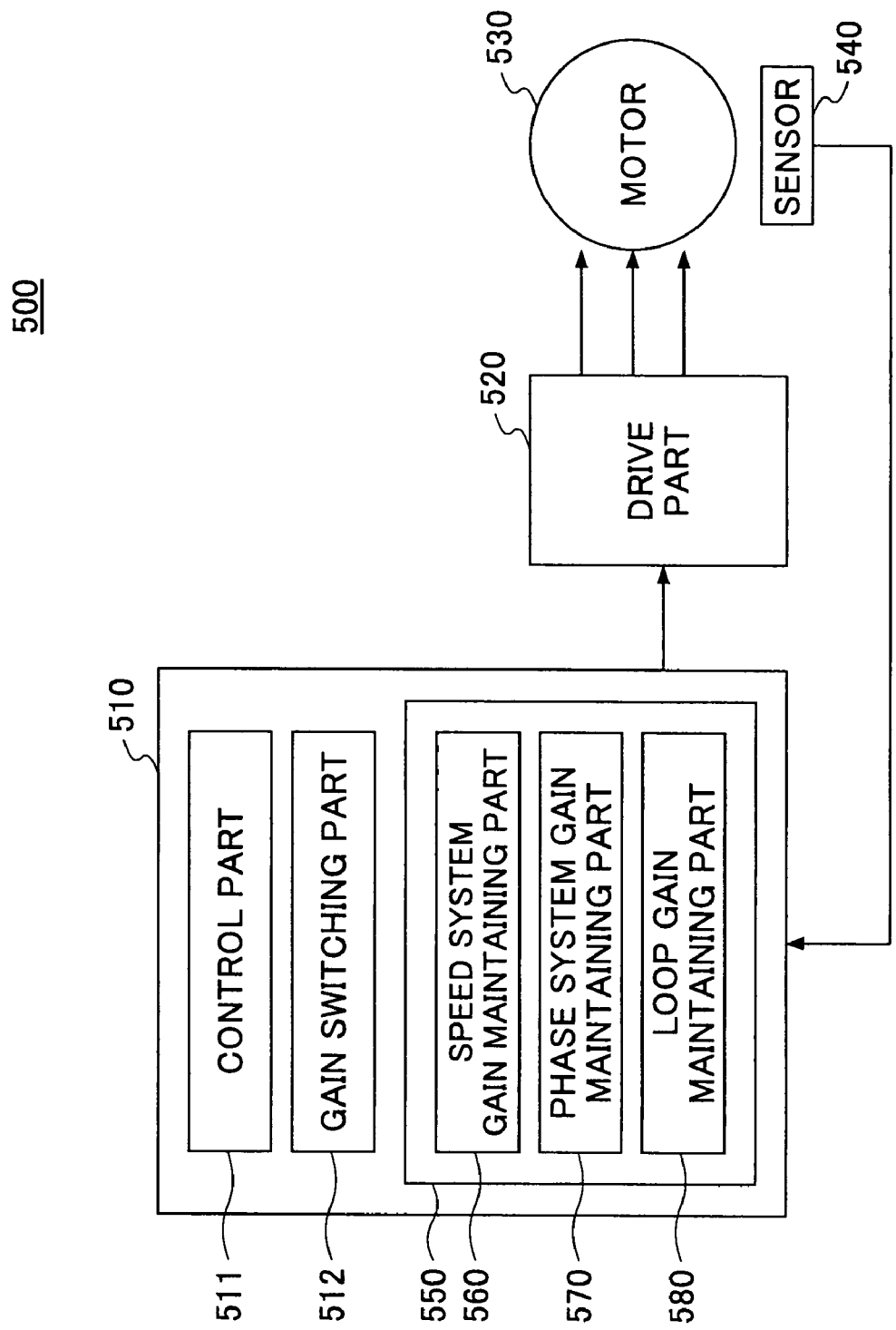
FIG. 5 is a schematic diagram for describing functions of a motor driving apparatus including a semiconductor device according to an embodiment of the present invention.

FIG. 5 is a schematic diagram for describing the functions of a motor driving apparatus 500 including a semiconductor device 510 according to an embodiment of the present invention.

The motor driving apparatus 500 includes the semiconductor device 510, a drive part 520, a motor 530, and a sensor 540. The motor driving apparatus 500 may be installed in an image forming apparatus, for example. In the motor driving apparatus 500, the sensor 540 detects the rotational frequency and the rotational position of the motor 530 and the semiconductor device 510 analyzes the detected rotational frequency and the rotational position of the motor 530. The drive part 520 operates as a closed loop by repeating the process of driving the motor 530 while correcting the rotational frequency and the phase of the motor 530 to desired values based on the analysis (analysis result). In controlling the rotation of the motor 530 with the motor driving apparatus 500, the overall gain of the closed loop is changed, to thereby change the driving torque that drives the motor 530. The overall gain of the closed loop is described in detail below.

The semiconductor device 510 includes a control part 511, a gain switching part 512, and a gain setting maintaining part 550. The control part 511 is for controlling various processes and calculations of the semiconductor device 510. The gain switching part 512 is for switching the gain that is maintained by the gain setting maintaining part 550.

For example, the gain setting maintaining part 550 may be digitized and include a speed system gain maintaining part 560, a phase system gain maintaining part 570, and a loop system gain maintaining part 580. The speed system gain, the phase system gain, and the loop gain maintained in the corresponding gain maintaining parts 560, 570, 580 are used as parameters when calculating the overall gain of the closed loop of the motor driving apparatus 500. It is preferable that each gain maintaining part 560, 570, 580 have plural gains maintained therein. Further details of each gain maintaining part 560, 570, 580 are described below.

The drive part 520 supplies drive torque to the motor 530 for driving the motor 530. The drive part 520 may include, for example, a power supplying part (not shown) and a drive amp (not shown). The gain of the drive part (i.e. drive system gain) is determined according to, for example, the gain of the drive amp. The motor 530 may be, for example, a DC motor or a brushless motor. The sensor 540 is for detecting rotational frequency and phase data of the motor 530. The rotational frequency of the motor 530 is determined according to the speed system gain, the phase system gain, the loop gain, the drive system gain, and the characteristics of the motor 530.

Next, the overall operation of the motor driving apparatus 500 according to an embodiment of the present invention is described.

As described above, the sensor 540 of the motor driving apparatus 500 detects the rotational frequency of the motor 530. In the semiconductor device 510, the control part 511 instructs the gain switching part 512 to switch gain based on the rotational frequency detected by the sensor 540.

For example, in a case of starting up the motor driving apparatus 500, the overall gain of the motor driving apparatus 500 is controlled to be a low value as the rotational frequency of the motor 530 becomes closer to the rotational frequency of steady state rotation so that a small drive torque is supplied to the motor 530 as the rotational frequency of the motor 530 becomes closer to the rotational frequency of the steady state rotation. In such a case of controlling the overall gain of the motor driving apparatus 500, the control part 511 instructs the gain switching part 512 to switch the gain(s).

Based on the instructions from the control part 511, the gain switching part 512 switches from the speed system gain, the phase system gain, and the loop gain that are currently set (maintained) in the gain setting maintaining part 550 to the speed system gain, the phase system gain, and the loop gain corresponding to the rotational frequency of the motor 530 (i.e. applicable frequency band of the motor 530).

The control part 511 generates signal components based on the speed system gain, the phase system gain, and the loop gain switched by the gain switching part 512 and supplies the signal components to the drive part 520. Then, the drive part 520 supplies drive torque to the motor 530 based on the overall gain of the closed loop of the motor driving apparatus 500 which is calculated (derived) from the signal components and the gain of the drive part (i.e. drive system gain).

In the motor driving apparatus 500 according to this embodiment of the present invention, the semiconductor device 510 changes/adjusts the overall gain of the closed loop of the motor driving apparatus 500 by selectively switching the speed system gain, the phase system gain, and the loop gain.

Figure 1:
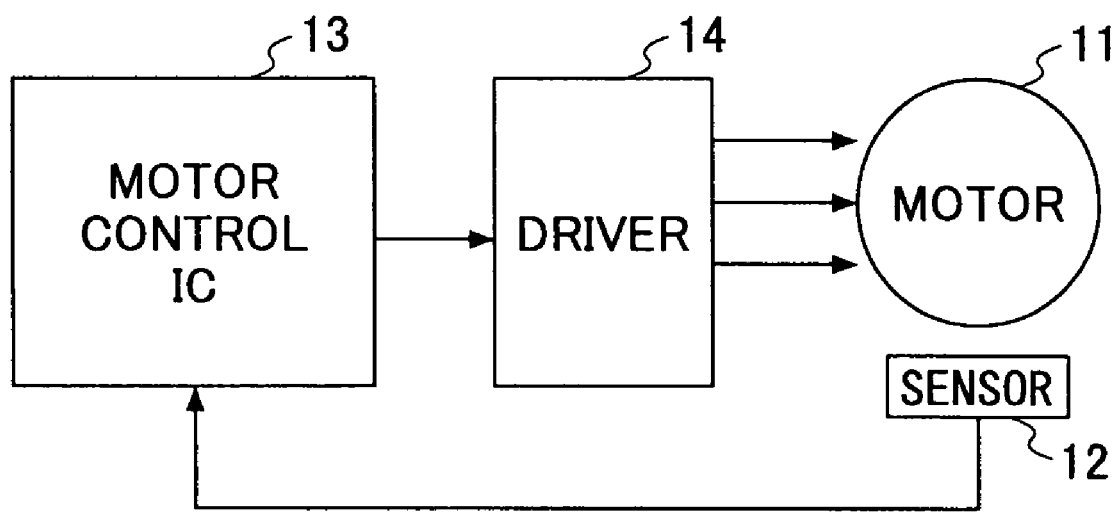
FIG. 1 is a schematic diagram showing a motor driving apparatus.
Figure 2:
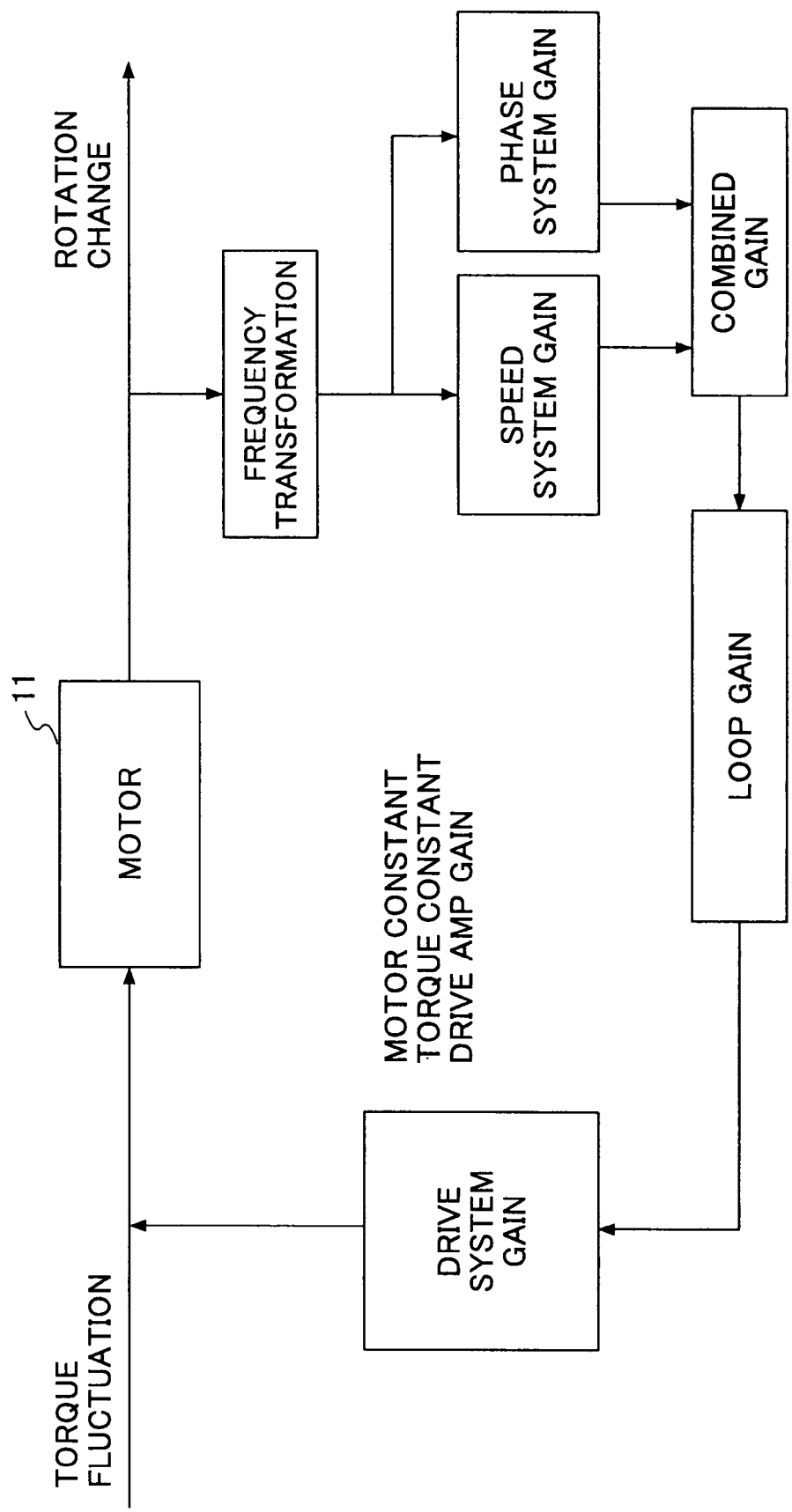
FIG. 2 is a schematic diagram for describing the overall gain of a motor driving apparatus.
Figure 3:
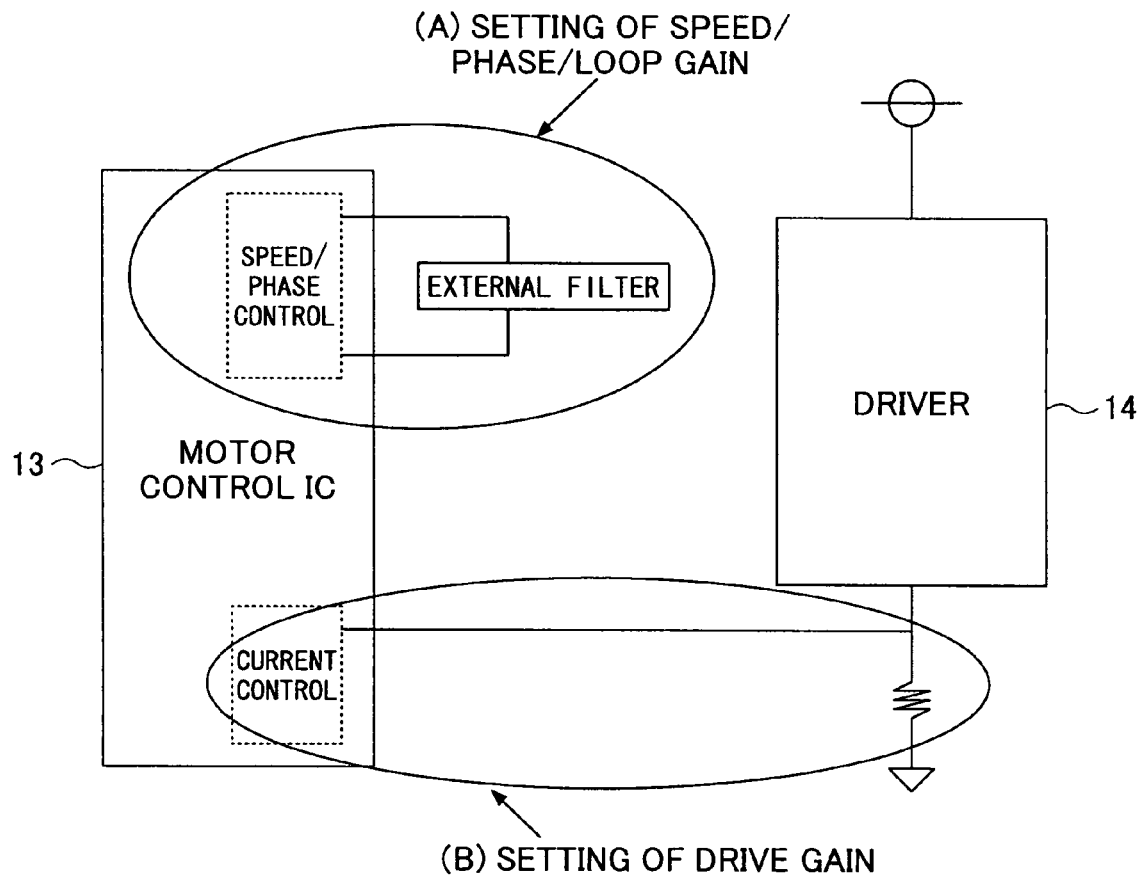
FIG. 3 is a schematic diagram for describing an external (outside) component of a motor driving apparatus.
Figure 4:
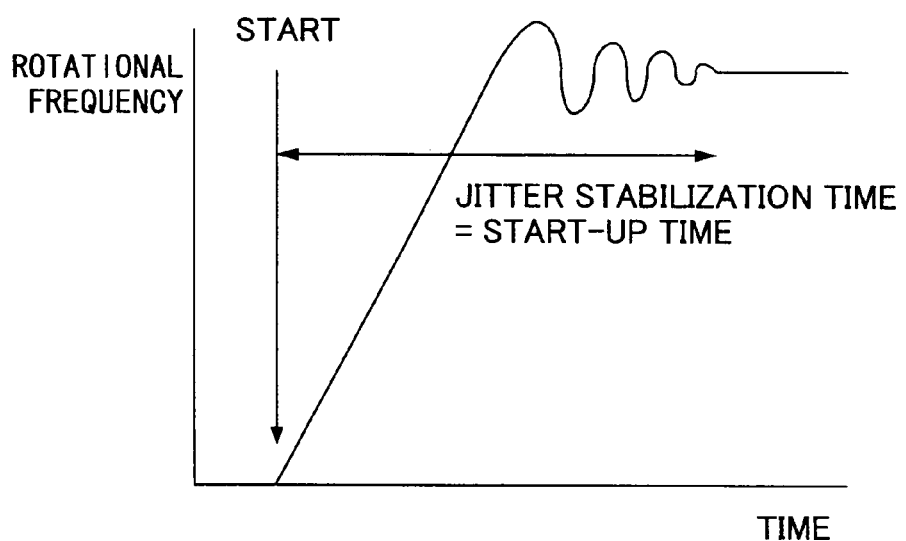
FIG. 4 is a schematic diagram for describing a start-up (activation) time and a rotational frequency of a motor according to a related art case.

Next, the overall gain of the closed loop of the motor driving apparatus 500 and the motor rotation control of the motor driving apparatus 500 are described. The overall gain of the closed loop of the motor driving apparatus 500 is described with reference to FIG. 2 used for describing a related art case.

As described above, the motor driving apparatus 500 controls the rotation of the motor 530 by changing the drive torque of the motor 530 by changing and adjusting the overall gain of the motor driving apparatus 500. The overall gain of the motor driving apparatus 500 can be calculated from five parameters consisting of the speed system gain, the phase system gain, the loop gain, and the drive system gain, and the characteristics of the motor 530.

The motor driving apparatus 500 according to this embodiment of the present invention may change any one or more of the speed system gain, the phase system gain, and the loop gain without changing the drive system gain and the motor characteristics. Next, the speed system gain, the phase system gain, and the loop gain according to this embodiment of the present invention are described.

The motor driving apparatus 500 includes a speed control loop (not shown) for controlling the rotational speed of the motor 530. The speed system gain according to an embodiment of the present invention is the gain of the speed control loop. The motor driving apparatus 500 also includes a phase control loop (not shown) for controlling the rotational phase of the motor 530. The phase system gain according to an embodiment of the present invention is the gain of the phase control loop. The motor driving apparatus 500 also includes a filter (not shown) for removing noise of signal components obtained from the speed control loop and the phase control loop. The loop gain according to an embodiment of the present invention is the gain of the filter.

In the motor driving apparatus 500 according to an embodiment of the present invention, the above-described gains are set and maintained in the gain setting maintaining part 550.

Figure 6:
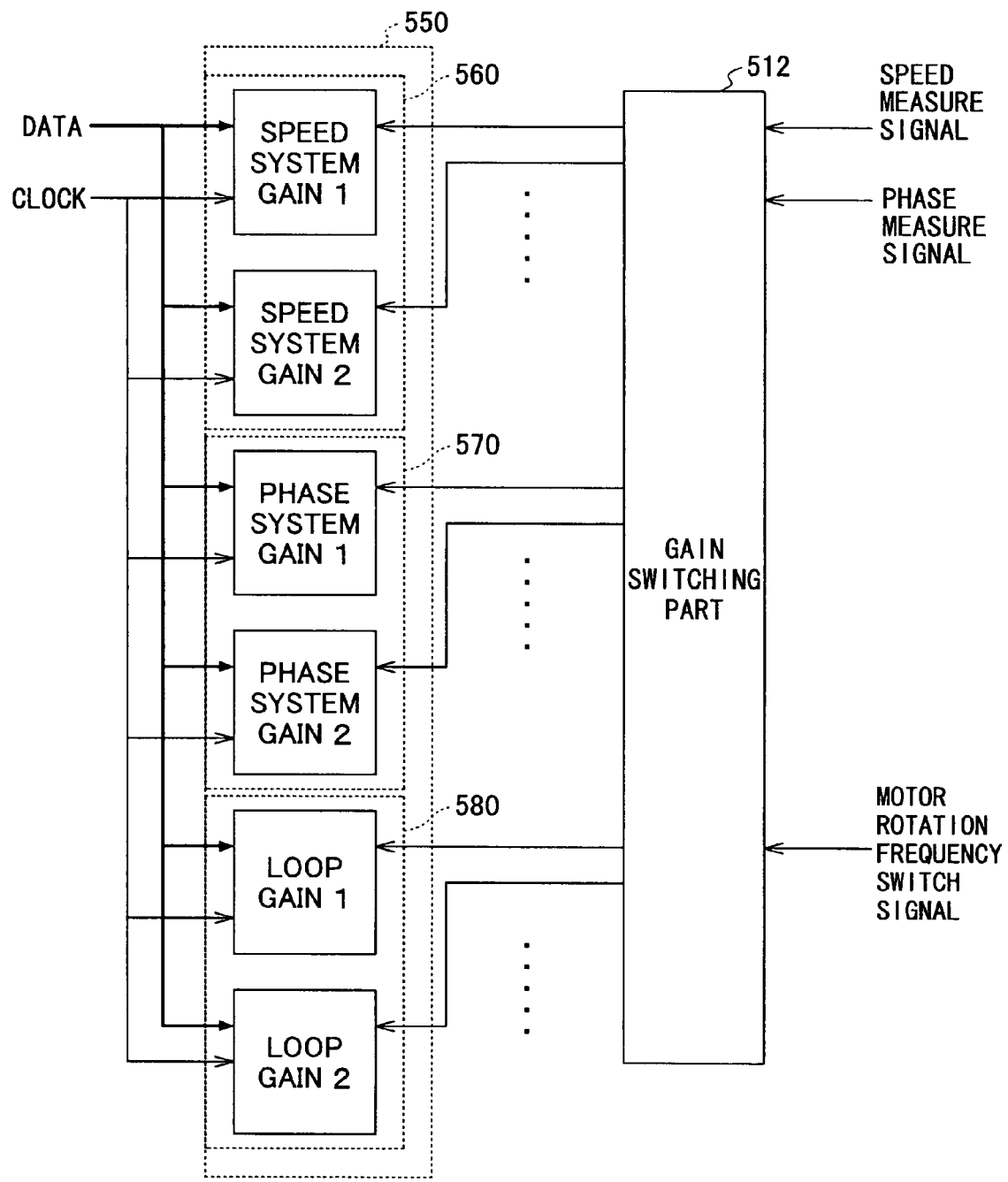
FIG. 6 is a schematic diagram for describing a gain setting maintaining part according to an embodiment of the present invention.

Next, the gain setting maintaining part 550 is described with reference to FIG. 6. FIG. 6 is a schematic diagram for describing the gain setting maintaining part 550 according to an embodiment of the present invention.

The gain setting maintaining part 550 consisting of, for example, the speed system gain maintaining part 560, the phase system gain maintaining part 570, and the loop gain maintaining part 580 includes plural registers. The speed system gain is set and maintained in the speed system gain maintaining part 560. The phase system gain is set and maintained in the phase system gain maintaining part 570. The loop gain is set and maintained in the loop gain maintaining part 580.

In the gain setting maintaining part 550 according to an embodiment of the present invention, two registers are included in each of the speed system gain maintaining part 560, the phase system gain maintaining part 570, and the loop gain maintaining part 580. The speed system gain maintaining part 560 has a predetermined value maintained in each of its registers, in which one value corresponds to a speed system gain 1 and the other value corresponds to a speed system gain 2. Likewise, the phase system gain maintaining part 570 has a predetermined value maintained in each of its registers, in which one value corresponds to a phase system gain 1 and the other value corresponds to a phase system gain 2. Likewise, the loop gain maintaining part 580 has a predetermined value maintained in each of its registers, in which one value corresponds to a loop gain 1 and the other value corresponds to a loop gain 2.

For example, the values of the speed system gain 1, the phase system gain 1, and the loop gain 1 may be used when obtaining the overall gain upon activation of the motor driving apparatus 500. Meanwhile, the values of the speed system gain 2, the phase system gain 2, and the loop gain 2 may be used when obtaining the overall gain upon steady state rotation of the motor driving apparatus 500. In this case, the values of the speed system gain 2, the phase system gain 2, and the loop gain 2 may be smaller than the values of the speed system gain 1, the phase system gain 1, and the loop gain 1.

In the motor driving apparatus 500 according to an embodiment of the present invention, a threshold is set for the rotational frequency of the motor 530. When the rotational frequency of the motor 530 reaches the threshold, the gain switching part 512 switches any of or all of the speed system gain, the phase system gain, the loop gain so that, for example, the drive torque supplied to the motor 530 is the minimum torque required for rotating the motor 530 in a steady state. Details of the threshold are described below. Thereby, the overall gain can be changed to an appropriate value corresponding to the rotational frequency of the motor 530 (i.e. applicable frequency band of the motor 530). In this example, the appropriate value is a value of the overall gain in a case where the motor 530 is rotated in a steady state by using the applicable frequency band of the motor 530.

Next, the threshold of the rotational frequency of the motor 530 is described.

In this example, the rotational frequency of the motor 530 is set with two thresholds. The two thresholds may be stored in a storage part (not shown) of the motor driving apparatus 500. Alternatively, the storage part may be installed in the semiconductor device 510. Furthermore, the threshold may be set beforehand by the user of an apparatus having the motor driving apparatus 500 installed therein.

By setting two thresholds for the rotational frequency of the motor 530, the applicable frequency band of the motor 530 can be divided into three frequency bands. Among the plural gains maintained in the gain setting maintaining part 550, a gain corresponding to one of the divided frequency bands is used to calculate the overall gain. Thereby, the motor driving apparatus 500 can stably rotate the motor 530 in correspondence with each of the frequency bands.

In this example, the first threshold (Threshold 1) is 1000 rpm and the second threshold (Threshold 2) is 2000 rpm.

Accordingly, the applicable frequency band of the motor 530 is divided into a first band where the rotational frequency of the motor 530 ranges from 0 to 1000 rpm (Band 1), a second band where the rotational frequency of the motor 530 ranges from 1000 to 2000 rpm (Band 2), and a third band where the rotational frequency of the motor 530 is greater than 2000 rpm (Band 3).

In this example, in a case where an applicable frequency band of the motor 530 shifts to another applicable frequency band when the rotational frequency of the motor 530 reaches a threshold, the gain switching part 512 selectively switches the six gains maintained in the gain setting maintaining part 550 so that a suitable combination of gains is used in correspondence with each applicable frequency band. It is to be noted that combinations of gains may be stored beforehand in a storage part (not shown) of the motor driving apparatus 500 for allowing the gain switching part 512 to switch the gains maintained in the gain setting maintaining part 550 according to the combinations of gains stored in the storage part.

In this example, the speed system gain 1, the phase system gain 1, and the loop gain 1 are used as the combination of gains corresponding to Band 1; the speed system gain 2, the phase system gain 2, and the loop gain 2 are used as the combination of gains corresponding to Band 2; and the speed system gain 2 and the phase system gain 1 are used as the combination of gains corresponding to Band 3.

Figure 7:
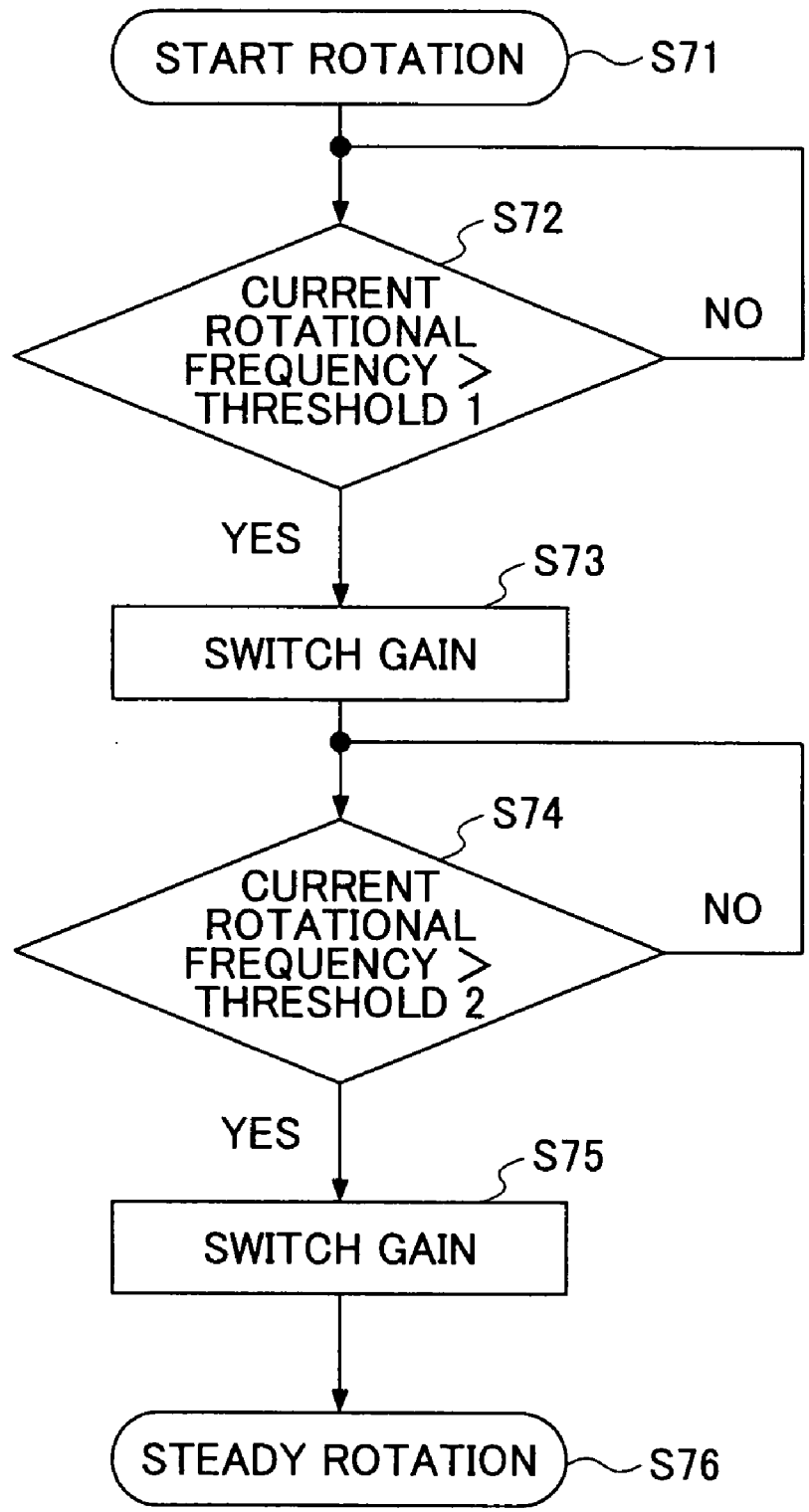
FIG. 7 is a flowchart for describing switching (changing) of gains and operation of a motor driving apparatus according to an embodiment of the present invention.
Figure 8:
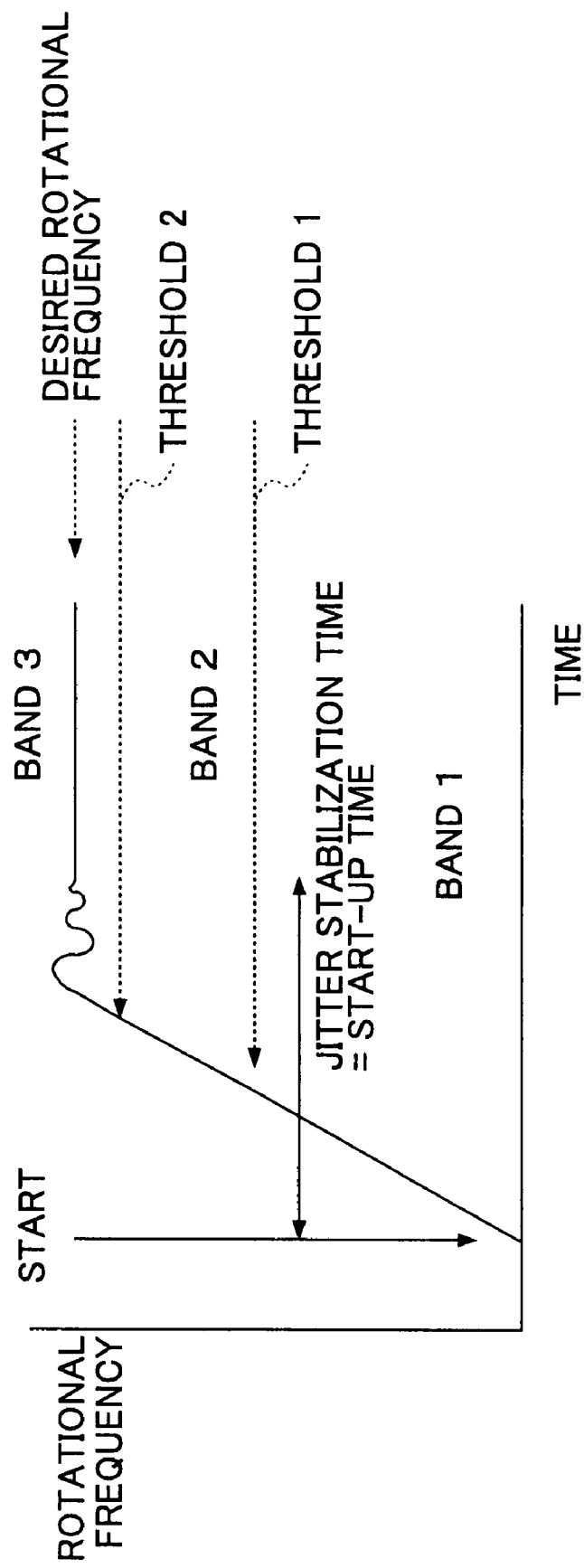
FIG. 8 is a schematic diagram for describing a start-up time and rotational frequency of a motor according to an embodiment of the present invention.

Next, the switching of gains in the motor driving apparatus 500 according to an embodiment of the present invention is described with reference to FIGS. 7 and 8. FIG. 7 is a flowchart for describing the switching of gains and operation of the motor driving apparatus 500 according to an embodiment of the present invention. This flowchart illustrates an operation of the motor driving apparatus 500 starting from rotation of the motor 530 and ending when the rotation of the motor 530 reaches a steady state. FIG. 8 is a schematic diagram for describing a start-up time and rotational frequency of the motor 530 according to an embodiment of the present invention.

In FIG. 7, when the motor 530 rotating upon activation of the motor driving apparatus 500 (Step S71), the sensor 540 detects the rotational frequency and the rotational position of the motor 530.

At this stage, since the rotational frequency of the motor 530 is no greater than 1000 rpm, the applicable frequency band is Band 1. Therefore, the overall gain of the motor driving apparatus 500 is calculated by using the speed system gain 1, the phase system gain 1, and the loop gain 1.

Then, the control part 511 determines that the rotational frequency of the motor 530 has reached Threshold 1 according to the detection result of the sensor 540 (Step S72). At this stage, the applicable frequency band of the rotational frequency of the motor 530 shifts from Band 1 to Band 2. Accordingly, the gain switching part 512 switches the gain(s) in the gain setting maintaining part 550 (Step S73).

More specifically, the speed system gain of the speed system gain maintaining part 560 is switched from speed system gain 1 to speed system gain 2. Furthermore, the phase system gain of the phase system gain maintaining part 570 is switched from phase system gain 1 to phase system gain 2. Furthermore, the loop gain of the loop gain maintaining part 580 is switched from loop gain 1 to loop gain 2.

After the switching of gains is reported from the gain switching part 512 to the control part 511, the control part 511 supplies signal components to the drive part 520 based on the speed system gain 2, the phase system gain 2, and the loop gain 2. The drive part 520 supplies drive torque to the motor 530 based on the signal components and the overall gain calculated from the drive system gain.

In this example, each gain is set so that the drive torque corresponding to Band 2 is smaller than the drive torque corresponding to Band 1. Taking into consideration that the rotational frequency of Band 2 is closer to a desired rotational frequency compared to that of Band 1 (See FIG. 8), setting the gains in the above manner prevents drive torque from being excessively supplied to the motor 530. Accordingly, the rotational frequency of the motor 530 can smoothly shift to a steady state when the rotational frequency of the motor 530 reaches the desired rotational frequency.

Then, the control part 511 determines that the rotational frequency of the motor 530 has reached Threshold 2 according to the detection result of the sensor 540 (Step S74). At this stage, the applicable frequency band of the rotational frequency of the motor 530 shifts from Band 2 to Band 3. Accordingly, the gain switching part 512 switches the gain(s) in the gain setting maintaining part 550 (Step S75).

More specifically, the phase system gain of the phase system gain maintaining part 570 is switched from phase system gain 2 to phase system gain 1. In Band 3, the loop gain is not used.

After the switching of gains is reported from the gain switching part 512 to the control part 511, the control part 511 supplies signal components to the drive part 520 based on the speed system gain 2 and the phase system gain 1. The drive part 520 supplies drive torque to the motor 530 based on the signal components and the overall gain calculated from the drive system gain.

In this example, each gain is set so that the drive torque corresponding to Band 3 is smaller than the drive torque corresponding to Band 2. Taking into consideration that the rotational frequency of Band 3 is closer to a desired rotational frequency compared to that of Band 2 (See FIG. 8), setting the gains in the above manner prevents drive torque from being excessively supplied to the motor 530. Thereby, the rotational frequency of the motor 530 can smoothly shift to a steady state when the rotational frequency of the motor 530 reaches the desired rotational frequency.

Then, the rotation of the motor 530 shifts to a steady state rotation when the motor reaches the desired rotational frequency (Step S76).

Hence, with the motor driving apparatus 500 according to the above-described embodiment of the present invention, unsteadiness in the rotation of the motor 530 can be stabilized. Furthermore, the rotation of the motor 530 can reach a steady state in a shorter time, to thereby shorten the start-up time of the motor 530.

In the semiconductor device 510, the registers in the loop gain maintaining part 580 may be provided in numbers equal to the number of divided applicable frequency bands of the motor 530. That is, since the applicable frequency band of the motor 530 is divided into three frequency bands (Band 1, Band 2, and Band 3) in the above-described embodiment, the loop gain maintaining part 580 may be configured having three registers. Such a configuration ensures a satisfactory following (tracking) ability for the rotational frequency of the motor 530 in correspondence with the applicable frequency band of the motor 530.

By setting thresholds of the rotational frequency of the motor 530, an appropriate gain can be set in correspondence with each frequency band divided by the thresholds. Furthermore, compared to a motor driving apparatus of a related art case where the speed system gain, the phase system gain, and the loop gain are fixed (invariable) in correspondence with an external component mounted to the motor driving apparatus, the speed system gain, the phase system gain, and the loop gain of the motor driving apparatus 500 are variable and digitally controllable. Thereby, the motor driving apparatus 500 can control rotation of the motor according to various operating statuses of the motor 530. Furthermore, with the present invention, since the speed system gain, the phase system gain, and the loop gain are variable and selectively switchable, the versatility of the motor driving apparatus 500 can be improved.

Since the overall gain can be suitably set in correspondence with each applicable frequency band of the motor 530, the motor 530 can be rotated at low speed and/or the motor driving apparatus 500 can be dormant in a case where an apparatus having the motor driving apparatus 500 installed therein is in a standby mode. This prevents unnecessary rotation of the motor 530 and reduces consumption of energy.

Furthermore, since the overall gain is changed and adjusted without changing the drive system gain, there is no need to supply large amounts of current to the drive part 520 for increasing the overall gain in a case of, for example, starting up the motor driving apparatus 500. Therefore, an increase of heat in the circuitry and deterioration of or damage to the circuitry can be prevented. This increases the safety of the motor driving apparatus 500 as well as an apparatus having the motor driving apparatus 500 installed therein.

Although the above-described embodiment of the present invention only describes a case of controlling the operation of starting up a motor, the present invention may also be applied to a case of stopping a motor rotating in a steady state or a case of returning from a low rotation rate (standby state) to a steady state rotation.

Second Embodiment

Next, a motor driving apparatus and a semiconductor device according to a second embodiment of the present invention are described.

In the second embodiment of the present invention, the configuration of a gain setting maintaining part 550A and a gain switching (gain changing) process are different from those of the first embodiment. Other functions and configurations of the second embodiment of the present invention are substantially the same as those of the first embodiment. Therefore, in the second embodiment of the present invention, like components (parts) are denoted by like reference numerals as of the first embodiment and are not further described.

Figure 9:
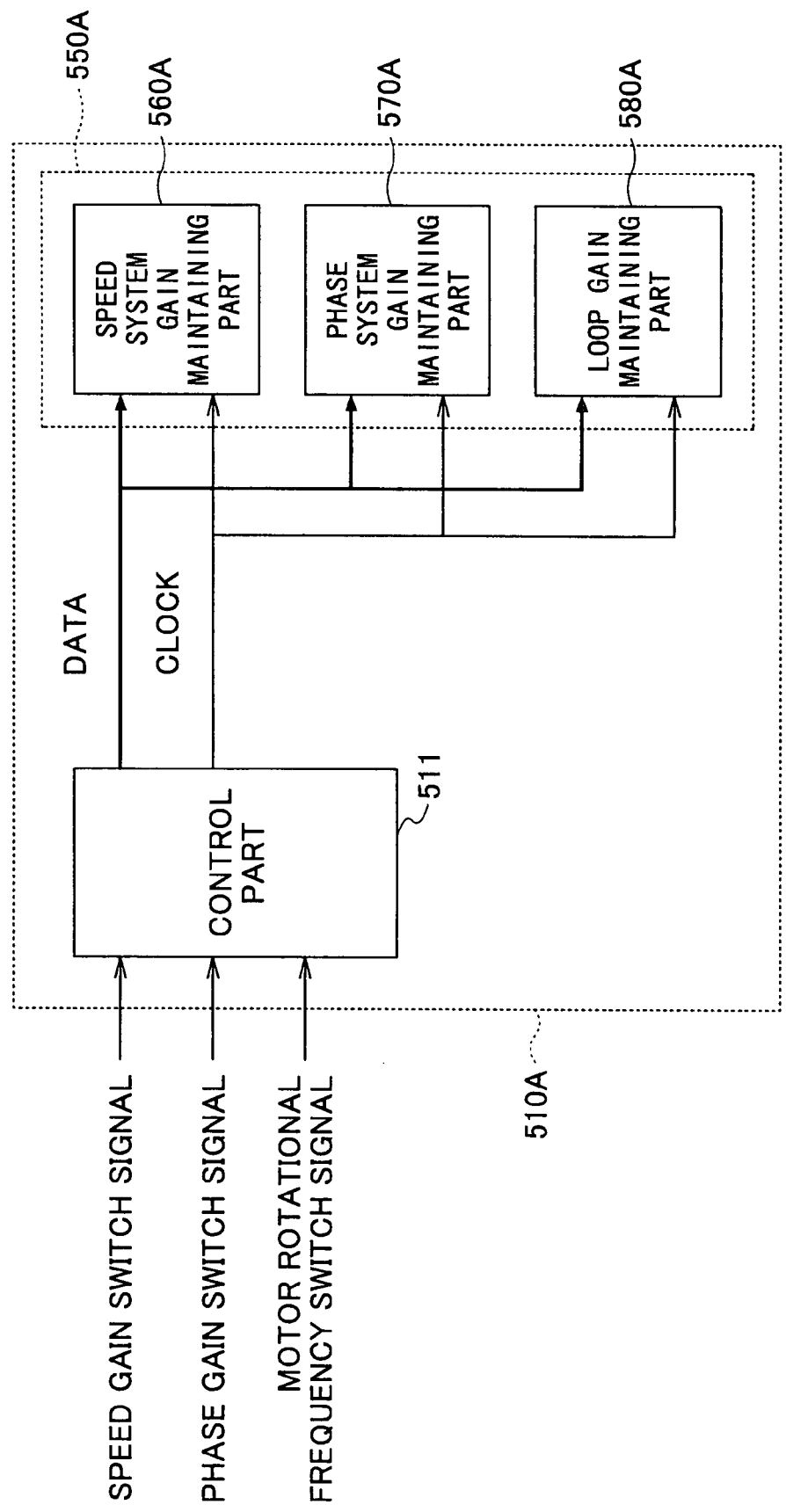
FIG. 9 is a schematic diagram for describing a semiconductor device of a motor driving apparatus according to another embodiment of the present invention.

FIG. 9 is a schematic diagram for describing a semiconductor device 510A of a motor driving apparatus according to the second embodiment of the present invention. The gain setting maintaining part 550A of the semiconductor device 510A includes a speed system gain maintaining part 560A, a phase system gain maintaining part 570A, and a loop gain maintaining part 580A. Each of the gain maintaining parts 560A, 570A, and 580A includes a single register.

In the gain setting maintaining part 550A, the control part 511 rewrites the gain of each gain maintaining part 560A, 570A, 580A with an appropriate gain when the rotational frequency of the motor 530 reaches a predetermined threshold, thereby changing the gain of each gain maintaining part 560A, 570A, 580A.

Next, a gain changing process according to the second embodiment of the present invention is described with reference to FIG. 7.

In Step S72 according to the second embodiment, the control part 511 determines that the rotational frequency of the motor 530 has reached Threshold 1 according to the detection result of the sensor 540. Then, in Step S73, the control part 511 performs a rewriting process on one or more of the speed system gain, the phase system gain, the loop gain set in the gain setting maintaining part 550A.

Then, in Step S74, the control part 511 determines that the rotational frequency of the motor 530 has reached Threshold 2 according to the detection result of the sensor 540. Then, in Step S75, the control part 511 performs a rewriting process on one or more of the speed system gain, the phase system gain, the loop gain set in the gain setting maintaining part 550A.

It is to be noted that the gains to be rewritten to the gain setting maintaining part 550A may be stored beforehand in a storage part (not shown) of the semiconductor device 510A. The storage part may also store data of each gain in correspondence with the applicable frequency bands of the motor 530. Accordingly, when the rotational frequency of the motor 530 reaches a predetermined threshold, the control part 511 reads out the data of each gain from the storage part and rewrites any one or more of the gains based on the read out data.

Hence, with the configuration of the semiconductor device 510A, the number of registers included in the gain setting maintaining part 550A can be reduced. This prevents increase in the scale of the circuitry of the semiconductor device 510.

Hence, with the semiconductor device according to above-described embodiments of the present invention, versatility of a motor can be improved and rotation of the motor can be appropriately controlled in correspondence with each applicable frequency band of the motor.

Further, the present invention is not limited to these embodiments, but variations and modifications may be made without departing from the scope of the present invention.

The present application is based on Japanese Priority Application No. 2006-202442 filed on Jul. 25, 2006, with the Japanese Patent Office, the entire contents of which are hereby incorporated by reference.

What is claimed is:

1. A semiconductor device included in a motor driving apparatus for driving a motor, the semiconductor device configured to control rotation of the motor by changing the gain of a control loop of the motor driving apparatus, the semiconductor apparatus comprising:
   a plurality of gain maintaining parts, each gain maintaining part setting at least one gain and maintaining the gain therein; and
   a gain switching part for switching the gains maintained in the gain maintaining parts according to a rotational frequency of the motor,
   wherein the gains maintained in the plural gain maintaining parts include a speed system gain, a phase system gain, and a loop gain, and each of the speed system gain, the phase system gain and the loop gain are switched according to the rotational frequency of the motor.

2. The semiconductor device as claimed in claim 1, wherein the gains maintained in the plural gain maintaining parts correspond to predetermined values.

3. A semiconductor device included in a motor driving apparatus for driving a motor, the semiconductor device configured to control rotation of the motor by changing the gain of a control loop of the motor driving apparatus, the semiconductor apparatus comprising:
   a plurality of gain maintaining parts, each gain maintaining part maintaining at least one gain therein, wherein the gains maintained in the plural gain maintaining parts include a speed system gain, a phase system gain, and a loop gain; and
   a control part for rewriting the gains maintained in the gain maintaining parts according to a rotational frequency of the motor, wherein each of the speed system gain, the phase system gain and the loop gain are rewritten according to the rotational frequency of the motor,
   wherein the control part rewrites one or more of the gains when the rotational frequency of the motor reaches a predetermined threshold.

4. The semiconductor device as claimed in claim 3, wherein the gains maintained in the plural gain maintaining parts correspond to predetermined values.

* * * * *